Feb. 5, 1957  R. H. DAVIES ET AL  2,780,238
LIQUID LEVEL CONTROL VALVE

Filed Aug. 16, 1952  2 Sheets-Sheet 1

INVENTORS
ROBERT H. DAVIES and
EVERETT H. BADGER, JR.
BY John N. Wolfram
ATTORNEY Feb. 5, 1957   R. H. DAVIES ET AL   2,780,238
LIQUID LEVEL CONTROL VALVE
Filed Aug. 16, 1952   2 Sheets-Sheet 2
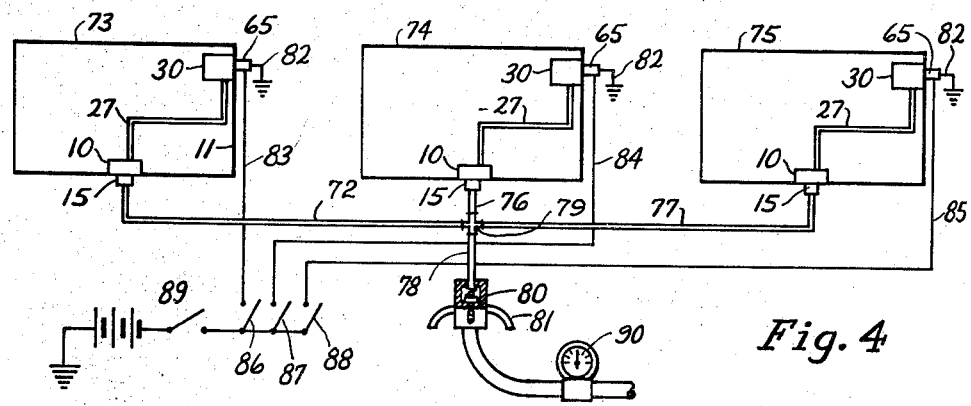
Fig. 4
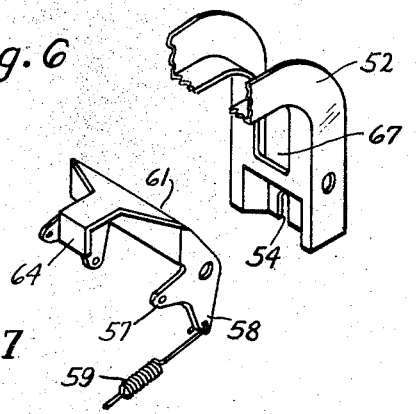
Fig. 6
Fig. 7
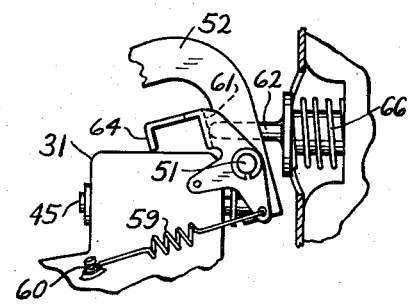
Fig. 5
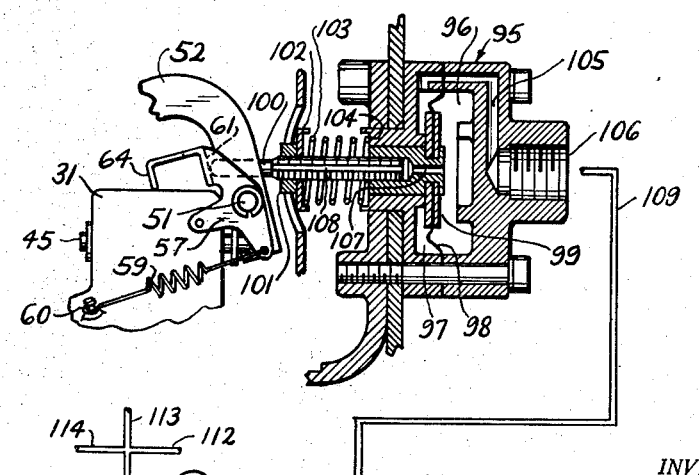
Fig. 8
INVENTORS
ROBERT H. DAVIES and
EVERETT H. BADGER, Jr.
BY John N. Wolfram
ATTORNEY

United States Patent Office 2,780,238
Patented Feb. 5, 1957

2,780,238
LIQUID LEVEL CONTROL VALVE

Robert H. Davies, Aurora, Ohio, and Everett H. Badger, Jr., Los Angeles, Calif.

Application August 16, 1952, Serial No. 304,815

9 Claims. (Cl. 137—390)

This invention relates to liquid level control valves of the type including a fluid pressure operated main valve controlled by a float operated pilot valve and provides a means for checking the proper functioning of the main valve and the pilot valve before proceeding with the filling of the tank in which the unit is installed.

The invention is of particular advantage in connection with aircraft fueling systems employing single point pressure refueling. In such systems the fuel tanks are connected to a common manifold having a single filling point to which a supply nozzle is connected when the tanks are to be filled. Fuel under pressure of 50 P. S. I. or more is then introduced through the nozzle and flows through the manifold to the various tanks. As each tank becomes full to the proper level a level control valve unit in the tank, comprising a fluid pressure operated main valve controlled by a float operated pilot valve, closes to shut off further flow of fuel into that tank. It is highly important that the level control valve perform its function since otherwise, if it failed to close, the incoming fluid would build up a pressure within the tank and cause the latter to burst. This would be a serious happening since the airplane would be put out of operation until the tank could be replaced or repaired.

To make sure that the level control valve unit is in proper operating condition, the present invention provides a means for testing the valve each time the tank is to be filled but before actual filling begins. This is accomplished by providing the float operated pilot valve with a mechanism which, under the control of the operator, will lift the float to its proper position for shutting off the pilot valve. The fuel supply is then turned on and if the fuel starts to flow the operator will know that the level control valve has not operated properly and he will then turn off the supply and not attempt to fill the tanks until the level control valve has been repaired or replaced.

The mechanism preferably includes a spring for lifting the float, although a weight or some other source of energy may be utilized, and also includes an overriding device for preventing the spring from acting upon the float. The overriding device is under the manual control of the operator and may be actuated either by a solenoid, a hydraulic piston, or other suitable means. When the spring is rendered ineffective by the overriding device, the float is free to operate in its normal manner.

The force exerted by the spring, weight, or other energy source is sufficient to overcome the weight of the float but is less than the buoyant force exerted upon the float when the tank has been filled with liquid to the desired level. Since the buoyant force is greater there is an assurance that if the spring can lift the float, the buoyant force will also be able to do so at the proper time.

Another use for the device is in connection with the selective filling of only certain tanks when a group of tanks are interconnected in a single point filling system. In this instance, when it is desired to fill only a certain tank or tanks, the operator actuates the float lifting mechanism for the tanks which are to remain empty and maintains this setting for the entire filling operation. With the float lifted, the pilot valve is in the closed position and will cause the main valve associated therewith to be held closed by the pressure of the fuel from the supply line.

From the above, it is apparent that it is an object of the invention to provide a level control valve whose proper functioning may be checked prior to the filling of a tank with which the valve is associated.

It is another object to provide a level control valve of the type including a fluid pressure operated main valve controlled by a float operated pilot valve in which a means is provided for lifting the float prior to the filling of the tank whereby proper functioning of the valve may be checked.

It is another object to provide a float operated pilot valve for a fluid pressure operated valve in which a source of energy is available for lifting the float but which is normally rendered ineffective for this purpose by an overriding force, which in turn is under the control of the operator for releasing the source of energy.

It is another object to provide a float operated pilot valve for controlling a fluid pressure operated valve in which the float will drop by gravity to open the pilot valve when fluid in the tank is below a predetermined level and which will be buoyed upwardly to close the pilot valve when the fluid is at or above the predetermined level, and in which a means is provided for lifting the float with a force less than that provided by buoyancy and at the will of the operator regardless of the level of the fluid in the tank.

It is another object to provide a level control valve of the type described in which a means is provided for lifting the float to close the pilot valve and hence the main valve regardless of the level of fluid within the tank, and in which the pressure from the fluid supply line may be utilized for rendering the lifting means ineffective.

Other objects will be apparent from the foregoing and from the following description of the preferred form of our invention and the drawings, in which.

Figure 3:
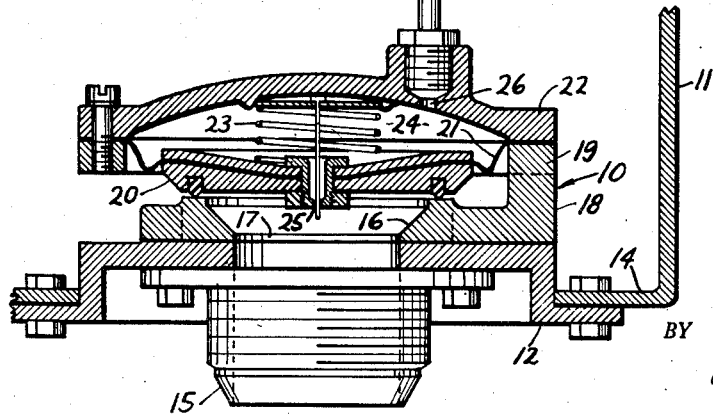

Figure 3 is a vertical cross-sectional view of the main fluid pressure operated valve, Figure 4 is a schematic view of a single point fueling system which includes 3 tanks, each of which contains a level control valve in accordance with the present invention, Figure 5 is a fragmentary view in elevation showing the float lifting mechanism and a solenoid overriding device for rendering the lifting mechanism ineffective, Figure 6 is a fragmentary perspective view of the arm which supports the float, Figure 7 is a perspective view of the float lifting device and Figure 8 is a fragmentary and partially schematic view of the float lifting mechanism with a hydraulic means for rendering the float lifting mechanism ineffective.

In a preferred embodiment of the invention there is a main fluid pressure operated valve 10 which is mounted on the wall of a tank 11 by means of a plate 12. This valve is shown as being mounted on the bottom wall 14 of the tank but it may, if preferred, be mounted on a side or top wall. A pipe line fitting 15 is connected to the plate 12 and is adapted to be connected by a suitable pipe line to a fuel intake system, one example of which is illustrated in Figure 4.

The main fuel pressure operated valve 10 includes a body section 16 having inlet port 17. The body section includes several radially spaced ribs 18 which support a clamping ring 19. A valve member 20 is attached to a flexible diaphragm 21 which in turn is clamped at its outer margin between a clamping ring 19 and a cap 22. A spring 23 normally keeps the valve member in closed position.

The cap 22 forms a pressure chamber 24 with the upper side of the diaphragm and valve member. A restricted orifice 25 permits fluid under pressure from the inlet port 17 to pass into the pressure chamber 24. A passage 26 in the cap and a tube line 27 conducts the fluid from the pressure chamber 24 into the float operated pilot valve generally designated as 30.

The pilot valve is installed at the upper side of the tank 11. It includes a body portion 31 having a port 32 to which the tubing line 27 may be attached by a suitable fitting. A bracket 33 is attached to the body 31 by means of bolts 34 and has threaded portions 35 by means of which the pilot valve may be mounted to the side wall of the tank 11 by the bolts 36.

The pilot valve body has a cylindrical bore 38 in which is pressed a valve sleeve 39. The valve sleeve has an annular groove 40 in communication with the passage 41 leading from the port 32 and has a second groove 42 in communication with a passage 43 in the bore 38 which is open to the interior of the tank 11.

The valve sleeve 39 has a bore 44 in which a valve plunger 45 is slidably mounted. The valve plunger has spaced heads 46 and 47 with a groove 48 therebetween. The body 31 has a pair of projecting lugs 50 which support a pivot pin 51. A float arm 52 is mounted on this pivot pin and carries a float 53 of cork or other buoyant material. The float arm is connected at one end to the pilot valve plunger 45, this end of the float arm being illustrated in Figure 6. A connection with the valve plunger is effected by means of the slot 54 and a groove 55 in the plunger.

Also mounted on the pivot pin 51 is a rocker member 57, this member being better illustrated in Figure 7. This member has an extension 58 to which is attached a tension spring 59, the other end of the tension spring being attached to the valve body at 60. The rocker member has a flat portion 61 which serves as an abutment surface for an extension 62 on a solenoid plunger 63. The rocker member also has a tongue 64 which is engageable with the top part of the pilot valve body 31 which surrounds the valve sleeve 39.

The solenoid plunger 63 is part of a solenoid assembly 65 which is attached to the bracket 33 and projects through an opening in the side of the tank wall 11. The solenoid plunger 63 is normally maintained in an extended position by the spring 66 with the extension 62 passing through an opening 67 in the float arm 52 and in engagement with the abutment surface 61 of the rocker member 57. The contact between the extension 62 and the abutment surface 61 is on the opposite side of the pivot 51 from the connection between the spring 59 and the rocker member extension 58 and the spring 66 thus acts in opposition to the spring 59. Furthermore, the force exerted by the spring 66 is sufficient to overcome that exerted by the spring 59 so that the rocker member 57 is normally held in its extreme position of counterclockwise rotation, as viewed in Figure 2, which rotation is limited by the engagement of the tongue 64 with the body member 31.

The body 31 is attached to a ring-like member 68 by several spaced ribs 69. Attached to the ring-like member 68 is a thin shell 70 which surrounds the pilot valve and the float to protect the same and to which a second ring-like member 71 is attached at the top end thereof.

Figure 4 illustrates a typical single point fueling system utilizing the level control valve of the present invention. In this illustration, three fuel tanks 73, 74 and 75 are each provided at their lower end with a fluid pressure operated main valve 10 and a float operated pilot valve 30 connected to the former by pilot tubing line 27. The inlet fittings 15 associated with each main valve 10 are connected to a common intake line 78 by means of lines 72, 76, and 77 through a four-way coupling 79. The line 78 has a valved opening 80 to which a supply nozzle 81 may be attached. The solenoid 65 associated with each of the float operated pilot valves 30 has one electrical lead 82 grounded and the other leads 83, 84 and 85 are connected to switches 86, 87 and 88, respectively. The circuits in turn are controlled by a master switch 89.

Figure 1:
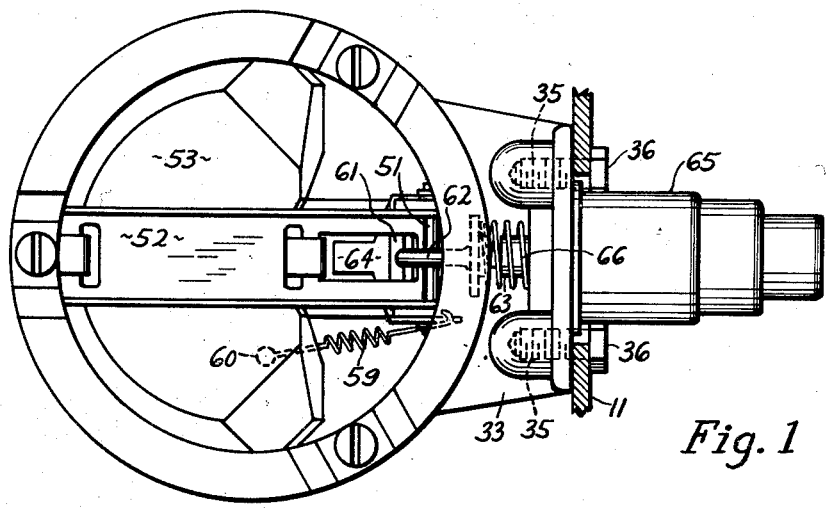
Figure 1 is a plan view of the float operated pilot valve.
Figure 2:
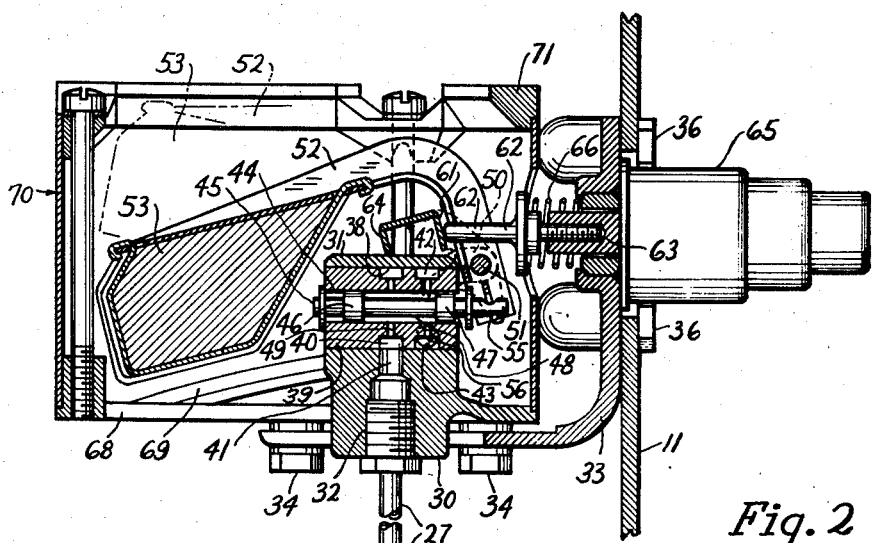
Figure 2 is a vertical cross-sectional view of the float operated pilot valve.

When it is desired to fill any or all of the tanks 73, 74 and 75, the supply nozzle 81 is attached to the valved opening 80. At this point, each of the main valves 10 is in the closed position as shown in Figure 3 and since the tanks are empty, each of the floats 53 for the pilot valves 30 are in their lowermost position due to gravity action, as illustrated in Figure 2. Also, the solenoids 65 are de-energized and the springs 66 cause the solenoid extensions 62 to force the rocker members 57 to the position shown in Figure 2 with the tongues 64 in engagement with the pilot valve bodies 31.

In the normal functioning of the level control valve, when the fluid supply is turned on to introduce fluid under pressure within the port 17 of the main valve, some of the fluid passes through restricted orifice 25 to the pressure chamber 24, then passes through the passage 26, the pipe line 27, the pilot valve port 41, the opening 49, the plunger groove 48, the passage 56, and out through the opening 43 into the interior of the tank. All of the passages between the pressure chamber 24 to the opening 43 and the interior of the tank are of greater flow capacity than the restricted orifice 25 and hence while these passages are open there will be no build up of pressure within the chamber 24 and fluid pressure within the port 17 will open the main valve 20 and permit the main flow of fuel into the tank. When the tank has been filled to a predetermined level, the float 53 will be buoyed upwardly by the fluid, moving the pilot valve plunger 46 leftwardly so as to cut off the flow through the passage 56. Pressure will now build up within the chamber 24 and act on the upper side of the valve member 20 to close the latter against the pressure of incoming fluid from the port 17.

Before proceeding with the filling operation the level control valves may be checked to assure proper operation for shutting off the incoming fuel when the tanks are full. First, the switches 86, 87, 88 and 89 are all closed and then the fuel supply from the nozzle 81 is turned on. Closure of the switches energizes each of the solenoids 65 and causes the plunger extensions 62 to be retracted. This permits the springs 59 for each of the pilot valves to move the rocker member 57 in a clockwise direction as viewed in Figure 2. This movement causes the surface 61 of the rocker member to engage the float arm 52 and lift the float to the position shown by the dotted line in Figure 2. This causes the pilot valve plunger 46 to move leftwardly for blocking off the passage of fluid through the opening 56. Closure of the pilot valve in this manner results in closure of the main fluid pressure operated valve 20 in the manner already described if all of the pilot valves and main fluid pressure operated valves are functioning normally. If the fluid supply from the nozzle 81 is now turned on, there will be no flow, which condition will be indicated by a flow meter 90.

If any of the pilot valves fail to close, as for example if either the float mechanism or the valve plunger has become stuck so that the rocker member 57, urged by the spring 59, has not been able to lift the float, there will be no build-up in the chamber 24 of the main valve and the latter will not close. Likewise, if the main valve 20 has become stuck in the open position, or if the diaphragm 21 should be ruptured, there will be flow of fuel into the respective tank. This flow will be registered on the flow meter 90 and will thus indicate to the operator that at least one of the level control valve units is not functioning properly. To determine which valve it is, the operator closes the switch 89 and each of the switches 86, 87 and 88 separately. As the switches for the two level control valves which are properly operating are turned on separately, the respective solenoid plunger extension 62 will be retracted to permit the spring 59 and the rocker member 57 to close that particular pilot valve. When the fluid supply is turned on, the related main valve 10 closes and flow occurs only through the two remaining level control valves. The extent of this flow registers on the flow meter 90. However, when the switch for the defective level control valve is operated, that valve will not shut off and flow will occur through all three level control valves. This greater flow will be detected by the flow meter and will indicate to the operator that the level control valve associated with the switch which was closed when the increased flow occurred is the one which is defective.

When it is desired to use the level control valves for preventing the filling of selected tanks, the switch associated with that tank is operated. This causes the solenoid plunger to be retracted so that the rocker member 57 will lift the float and cause the pilot valve to be shut off in the manner previously mentioned. The switch is maintained in the closed position until the other tanks have been filled and the fluid supply cut off.

In an optional arrangement, the solenoid 65 may be replaced by a hydraulic actuator, as shown in Figure 8. This actuator includes a casing 95 having a chamber divided into two sections 96 and 97 by a diaphragm 98. Attached to the diaphragm is a plunger assembly 99. This assembly includes a plunger extension 100 on which is threaded a nut 101 for retaining a spring follower 102. A spring 103 is interposed between the follower 102 and a shoulder 104 in the casing 95. A passage 105 connects a port 106 with the chamber 97. The chamber 98 is vented through an opening 107 in a slot 108 in the plunger extension 100 to the interior of the tank.

The port 106 may be connected by means of a pipe line 109 to a valved opening 110 to which a supply nozzle 111 may be connected. As in Figure 4, pipe lines 112, 113 and 114 are main supply conduits leading from the valved opening 110 to the tanks. A valve 115 controls the flow of fluid through the line 109.

In the condition for normal filling of the tanks, the valve 115 is in the closed position to prevent the fluid under pressure from passing from the valved opening 110 to the diaphragm chamber 97, and the spring 103 keeps the plunger 100 in the extended position to hold the rocker member 57 in the position shown in Figure 8 against the action of the spring 59. This permits the float 53 to drop by gravity to its lowermost position when the tank is empty.

To check the operation of the level control valve before filling the tank, the supply nozzle 111 and the valve 115 are both turned on. Fluid from the supply passes through the valve 115, the line 109, the port 106, and passage 105 and acts on the left side of diaphragm 98. This moves the diaphragm to the right, carrying with it the plunger extension 100 against the action of the spring 103 to release the rocker member 57. Spring 59 then moves the rocker member into engagement with the float arm 52 to lift the float. Flow through the supply nozzle may then be checked as previously described to determine whether the level control valve is defective.

We claim:

1. In a valve for controlling the level to which a tank may be filled with a given liquid, a body having a port therethrough, a valve member movable in said body for opening and closing the port, a float connected to the valve member and movable by gravity to a position for opening the valve and movable by a buoyant force developed when the float is submerged in the given liquid to a position for closing the valve, actuator means operable upon the float with a force sufficient to overcome the gravity action upon the float for moving the float to a valve closing position, said last mentioned force being less than said buoyant force, and an overriding device operable on said actuator means for normally preventing the same from moving the float whereby the float may freely move said valve between open and closed positions, and means operable on the overriding device for preventing the latter from operating on the actuator means whereby the actuator means will move the float to valve closing position.

2. In a valve, a body having a port therethrough, a valve member movable in said body for opening and closing the port, a float member connected to the valve member for moving the same to open and closed positions, an actuator member on the body engageable with the float member for moving the same to valve closing position, a first spring means on the body acting on the actuator member for constantly urging the actuator member toward engagement with the float member for moving the same into valve closing position, a second spring means fixedly mounted opposite said actuator member and acting on the actuator member in opposition to said first spring means and normally effective to prevent said first spring means from moving said actuator member, a solenoid and means operated thereby when energized for overcoming the second spring means whereby the first spring means will move said actuator member into engagement with the float member and cause the latter to move the valve to closed position.

3. In a valve, a body having a port therethrough, a valve member movable in said body for opening and closing the port, an arm pivotally mounted on the valve and connected to the valve member, a float on said arm, a pivotal member mounted on the valve for raising the float arm and closing the valve, means normally urging the pivotal member into float-raising position, an overriding device fixedly mounted adjacent said pivotal member for normally holding the latter out of engagement with the float arm and a retracting element for said overriding device.

4. In a valve, a body having a port therethrough, a valve member movable in said body for opening and closing the port, an arm pivotally mounted on the valve and connected to the valve member, a float on said arm, a pivotal member mounted on the valve for raising the float arm and closing the valve, means normally urging the pivotal member into float-raising position, an overriding device fixedly mounted adjacent said pivotal member for normally holding the latter out of engagement with the float arm and a manually controllable means for rendering the overriding device inoperative.

5. In a valve, a body having a port therethrough, a valve member movable in said body for opening and closing the port, an arm pivotally mounted on the valve and connected to the valve member, a float on said arm, a pivotal member mounted on the valve for raising the float arm and closing the valve, means normally urging the pivotal member into float-raising position, an extendable plunger fixedly mounted opposite the pivotal member for normally holding the latter out of engagement with the float arm and a retracting element for said plunger.

6. In a fluid control valve, a body having a port therethrough, a valve member movable in said body for opening and closing the port, an arm pivotally mounted on the valve and connected to the valve member, a float on said arm, a pivotal member mounted on the valve for raising the float arm independently of the fluid level, means on the valve engaging the pivotal member for normally urging it into float-raising position with less force than the buoyancy of the fluid on the float, an overriding device fixedly mounted adjacent said pivotal member for normally holding the latter out of engagement with the float arm and a retracting element for said overriding device.

7. In a fluid control valve, a body having a port therethrough, a valve member movable in said body for opening and closing the port, an arm pivotally mounted on the valve and connected to the valve member, a gravity-operated float on said arm for opening said valve and movable by buoyancy of the fluid at its upper level to close said valve, a pivotal member mounted on the valve for raising the float arm independently of the fluid level, means normally urging the pivotal member into float-raising position, an overriding device fixedly mounted adjacent said pivotal member for normally restraining the pivotal member and permitting the float to respond to the buoyancy of the fluid and means for rendering said overriding device inoperative.

8. In a fluid control valve having a body with a port therethrough and a valve member movable in said body for opening and closing said port, a float pivotally mounted on the valve and having a gravity-operated arm for opening said valve and movable by the buoyance of the fluid at its upper level to close said valve port, a pivotal member mounted on the valve for raising the float arm, means on the valve normally urging the pivotal member into float-raising position with less force than the buoyancy of the fluid, an overriding device fixedly mounted adjacent said pivotal member for restraining the pivotal member with a force greater than and in opposition to said first mentioned means and manually controllable means for rendering said overriding device inoperative.

9. In a valve, a body having a port therethrough, a valve member movable in the body for opening and closing the port, float means engageable with the valve member for controlling opening and closing movement of the same, a spring pressed actuator means movably supported in position for being engageable with the float means for moving the same to cause the valve member to be moved to port closing position, an overriding spring pressed device operable on said actuator means for normally preventing the same from engaging the float means whereby the float means may freely move said valve member between open and closed positions, and means operable on the overriding spring pressed device for preventing the latter from operating on the actuator means whereby the actuator means will move the float to valve closing position.

References Cited in the file of this patent

UNITED STATES PATENTS

| | | |
|---|---|---|
| 1,179,538 | Mapel | Apr. 18, 1916 |
| 1,179,540 | Mapel | Apr. 18, 1916 |
| 2,174,055 | Coleman | Sept. 26, 1939 |
| 2,199,538 | Curry | May 7, 1940 |